United States Patent [19]

Meyer

[11] Patent Number: 5,784,277
[45] Date of Patent: Jul. 21, 1998

[54] REAL-TIME AUDIO PACKET LAYER ENCODER

[75] Inventor: Thomas John Meyer, Mercerville, N.J.

[73] Assignee: RCA Thomson Licensing Corporation, Princeton, N.J.

[21] Appl. No.: 596,182

[22] PCT Filed: Sep. 10, 1993

[86] PCT No.: PCT/US93/08620

§ 371 Date: Feb. 15, 1996

§ 102(e) Date: Feb. 15, 1996

[87] PCT Pub. No.: WO95/07579

PCT Pub. Date: Mar. 16, 1995

[51] Int. Cl.$^6$ .................................................. H04N 7/00
[52] U.S. Cl. .................. 364/400.01; 348/462; 348/467; 370/471; 370/474
[58] Field of Search ................. 364/400.01; 370/470, 370/472, 476, 510, 512, 474, 471, 509, 522, 392; 348/423, 512, 515, 426, 513, 526, 467, 462, 384; 395/2.91, 2.92; 386/101, 104

[56] References Cited

U.S. PATENT DOCUMENTS

| | | | |
|---|---|---|---|
| 4,920,534 | 4/1990 | Adelmann et al. | 370/94.1 |
| 5,010,549 | 4/1991 | Katou et al. | 370/110.1 |
| 5,168,356 | 12/1992 | Acampora et al. | 358/133 |
| 5,365,272 | 11/1994 | Siracusa | 348/426 |
| 5,371,547 | 12/1994 | Siracusa et al. | 348/426 |
| 5,483,287 | 1/1996 | Siracusa | 348/426 |
| 5,550,593 | 8/1996 | Nakabayashi | 348/465 |
| 5,559,999 | 9/1996 | Maturi et al. | 395/550 |
| 5,565,923 | 10/1996 | Zdepski | 348/423 |
| 5,568,274 | 10/1996 | Fujinami et al. | 386/107 |
| 5,568,403 | 10/1996 | Deiss et al. | 364/514 R |
| 5,596,581 | 1/1997 | Saeijs et al. | 370/394 |

FOREIGN PATENT DOCUMENTS

| | | |
|---|---|---|
| 0425834 | 5/1991 | European Pat. Off. |
| 2104350 | 3/1983 | United Kingdom |

OTHER PUBLICATIONS

36th IEEE Computer Society International Conference, 25 February 1991, San Francisco, US, James D. Johnston "MPEG-Audio Draft, Description as of Dec. 10, 1990", pp. 336–337.

*Primary Examiner*—Emanuel Todd Voeltz
*Assistant Examiner*—Tony M. Cole
*Attorney, Agent, or Firm*—Joseph S. Tripoli; Eric P. Herrmann; James B. Hayes

[57] ABSTRACT

A packet encoder includes various sources of data, a state machine and additional circuitry. The state machine provides an S-bit output signal. N of the output bits of the state machine, (N<S), are coupled to directly control a multiplexer without an intervening state decoder. The multiplexer combines data from the various sources into a packet signal.

9 Claims, 7 Drawing Sheets

REAL-TIME AUDIO PACKET LAYER ENCODER

This invention is directed toward a method and apparatus for encoding audio data in a packet format according to a predetermined protocol.

BACKGROUND OF THE INVENTION

High Definition Television (HDTV) is generally used to describe systems which provide high definition video, stereo sound and auxiliary data within given constraints of bandwidth, compatibility, and cost. The primary concerns of HDTV are to digitize a high resolution signal, compress the digital signal to fit into a standard television channel, and then transmit this compressed digital signal over a 6 MHz channel within predetermined constraints. The high resolution signal is separated into its video, audio and data components. Each is compressed and encoded separately from the other components.

The compression and encoding of the audio digital signal in the present system will be described in terms of MPEG standards. MPEG is an international standard developed by the Moving Pictures Experts Group of the International Standards Organization for coded representation of moving pictures and associated audio stored on digital storage medium.

The audio processing function conditions a compressed audio signal for eventual transport terrestrially, through a satellite, or through other transmission media. The audio processing function accepts a serial stream of compressed audio frames from a frame encoder, such as a CCS-CDQ-2000 compressor available from CCS Audio Products. The frame encoder provides an audio MPEG signal at an output digital bit rate user selectable from 56 to 384 Kbps depending on the quality of the desired output. An audio processor converts the bit stream into a byte-wide digital signal and inserts appropriate header information to create MPEG packets and transport packets. The audio processor may include a clock and timing generator, frame synchronizer, MPEG packet encoder, transport processor, and output buffer. The present invention concerns an MPEG packet encoder which encodes a byte-wide digital signal supplied by a frame synchronizer into MPEG transport packets.

An MPEG packet encoder may include a multiplexer to concatenate header information with the digital audio data signal, circuitry to supply header information, and a sequence controller or state machine to control the input of the header information to the multiplexer.

SUMMARY OF THE INVENTION

A frame synchronizer supplies a frame aligned byte-wide data signal to a multiplexer through delay circuitry. The delay circuitry delays the data signal to allow a predetermined number, for example eight, of bytes of information to be inserted as a frame header. Portions of the header information may be calculated prior to an encoding session and stored in a storage medium. The frame synchronizer supplies a start-of-frame signal to a package sequence controller. In response to a start-of-frame signal, the package sequence controller generates control signals to control the insertion of header information from the storage medium into the data signal and to control the operation of the multiplexer. The package sequence controller includes a state machine that has each state predefined to directly control the multiplexer or other circuitry.

A particular embodiment of the invention includes a packet encoder having a state machine which provides an S-bit output signal defining a plurality of system states, various sources of header data and compressed audio data and a multiplexer.

N of the output bits of the state machine, (N<S), are coupled to directly control the multiplexer. Under this control, the multiplexer concatenates header and compressed audio data into packets according to a predetermined protocol. Respective states of the state machine are selected such that the N bits control the multiplexer without an intervening state decoder.

DETAILED DESCRIPTION

Figure 1:
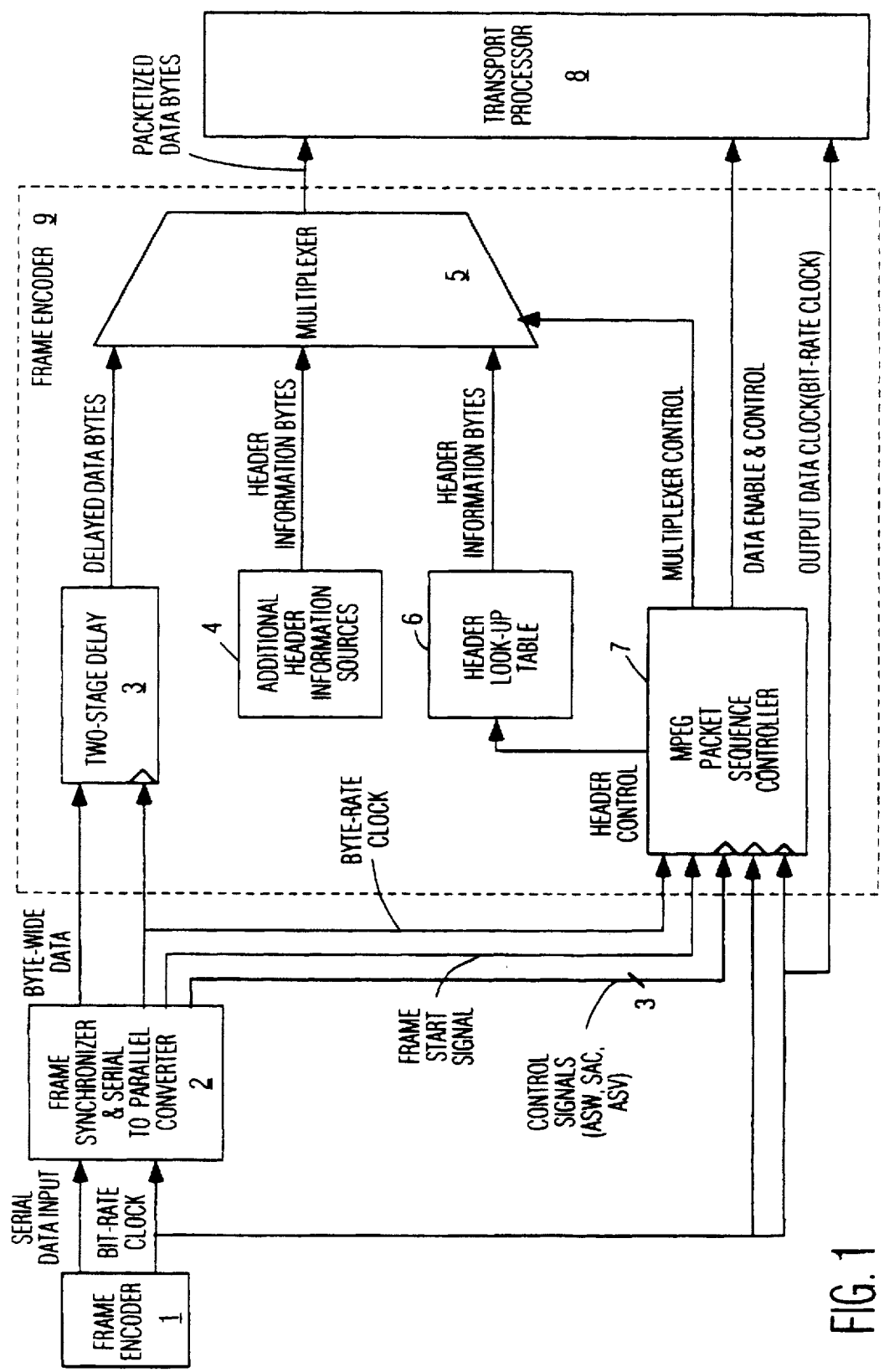
FIG. 1 is a block diagram of an embodiment of a realtime audio MPEG packet layer encoder embodying the present inventions.

FIG. 1 represents a block diagram of an audio encoder encompassing embodiments of the inventions presented. In FIG. 1, a serial data input signal and a bit rate clock signal are supplied by a frame encoder 1, such as a CCS-CDQ-2000, to a frame synchronizer and serial to parallel converter 2. The CCS-CDQ-2000 is used to convert analog audio signals into their digital equivalent by sampling the audio signals at the rate of 48 Ksps (kilo samples per second) using a 16 bit analog to digital converter. The digitized audio is then compressed using the ISO MPEG layer 2 algorithm (MUSICAM) and the resulting digital signal is output through V.35, X.21 or RS422 digital outputs. The output digital bit rate is user selectable from 56 to 384 Kbps (kilo bits per second) depending on the quality of the desired output.

The frame length and data rate of the serial data input signal are variable and are determined by the configuration of the CCS-CDQ-2000. Typical frame intervals include 24 msec of continuous real-time audio signal compressed to a serial bit stream occurring at 256 Kbps. The MPEG audio frame includes a 16 bit audio frame sync word (start of frame code). Additionally, the transmitted MPEG audio frame contains quantized audio values as well as auxiliary information describing bit allocation and scale factors, all of which are required by the decoder to reproduce the audio information.

The frame synchronizer 2 and encoder 9 reorder the serial data and add, for example, header data to conform the CDQ-2000 digital output signal to MPEG packet protocol. The frame synchronizer 2 accepts the serial data input signal from the CCS-CDW-2000 Audio encoder 1. The frame synchronizer generates a byte-wide (8 bit bytes) data stream with byte boundaries justified to the start of the audio frame sync word from the CDQ-2000 output signal. In addition, the frame synchronizer 2 generates a byte-rate clock and an audio frame sync pulse that is one bit-rate audio clock period in length and which spans the positive transition of the byte clock for the first byte of the audio frame.

Data from the frame synchronizer 2 is applied to a packet encoder 9. The encoder 9 adds variable header and timing information to the compressed audio data. Included in the encoder 9 are a compensating delay 3, sources of header and/or auxiliary information 4 and 6, a multiplexer 5 for combining data and a controller 7 for coordinating each of the processing elements within the encoder 9.

The encoder 9 accepts audio frames in byte-wide format from the frame synchronizer 2. Transfer of data and header information in the encoder 9 is accomplished under control of the bit-rate clock, which runs at eight times the byte-wide data rate for each selectable data rate. Transfer of the byte-wide data stream is buffered through a two-stage delay 3 and supplied to a multiplexer 5. The delay 3 is included to provide the multiplexer 5 time to insert, in this example, up to 16 header bytes into the byte wide data stream while accepting a continuous flow of data. The bytes of information (header bytes) are inserted prior to start-of-frame code present in said data signal.

Figure 2:
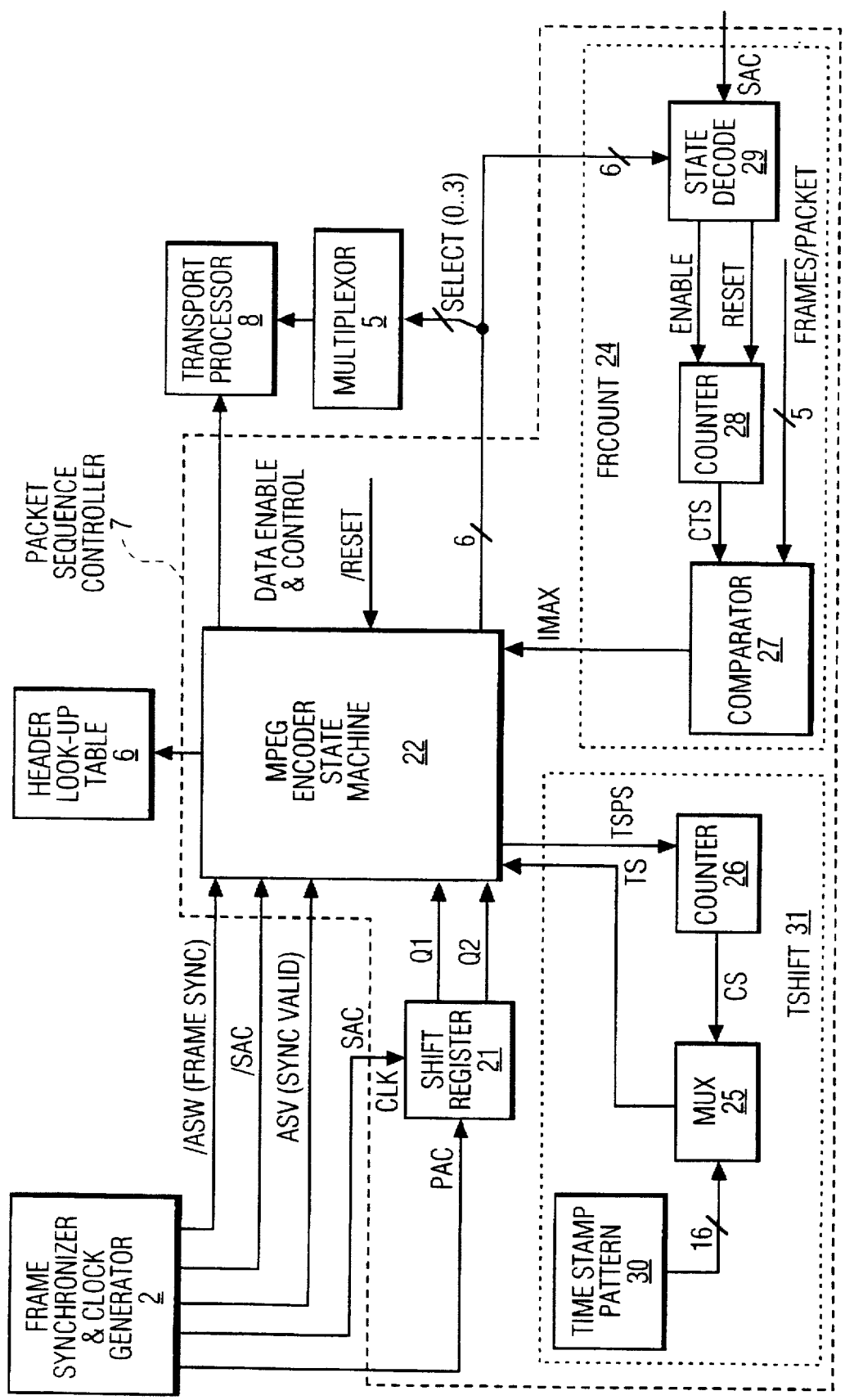
FIG. 2 is a block diagram of an embodiment of an MPEG packet sequence controller.

The frame synchronizer 2 supplies an audio sync pulse or start-of-frame signal to a package sequence controller 7 to indicate that the start of a frame has been detected. The sequence controller 7 generates output control signals for controlling the multiplexer 5, header circuitry 6 and a transport processor An exemplary, sequence controller is illustrated in FIG. 2. This sequence controller includes a state machine 22, circuitry to control time-stamping of packets 31 (TSHIFT), and circuitry to count the number of frames included in each packet 24 (FRCOUNT). Thre circuitry TSHIFT 31 includes a 16 to 1 multiplexer 25 and a counter 26. The counter 26 is an up-counter with wrap-around. The counter increments its count value responsive to a signal TSPS provided by the state machine 22. The signal TSPS indicates the end of respective audio packets. The counter 26 supplies a counter signal CS to the control input port of a 16 to 1 multiplexr 25 that indicates the packet count. The 16 to 1 multiplexer also receives 16 signals from, in this example, 16 switches 30, that are preset by the user. In the alternate, the signals could be generated under control of a microprocessor The 16 signals form a "pattern" which determines which packets are to be time-stamped, i.e. every other, every third all. The 16 to 1 multiplexer 25 generates a signal TS based on the "pattern" and the packet count indicating whether a timestamp should be included with the next packet.

Additional circuitry, FRCOUNT 24, counts the number of frames included in each packet compares the value co the desired number as set on in this example, a set of switches (FRAMES/PACKET), and informs the State machine when the two match through a signal IMAX. FRCOUNT includes a state decoder 29, a 5 bit counter 28, and a comparator 27. The state decoder 29 is arranged to monitor the states of the state machine 22 and to recognize two unique states designated herein as START CODE 1 (SC1) and INCREMENT (INC). The state SC1 indicates the start of a new packet, and responsive to recognition of this state, the decoder 29 resets the counter 28 to a predetermined value, for example zero. The state INC indicates the end of the current frame and responsive to the recognition of this state the decoder 29 increments the counter 28 by one unit.

Figure 3:
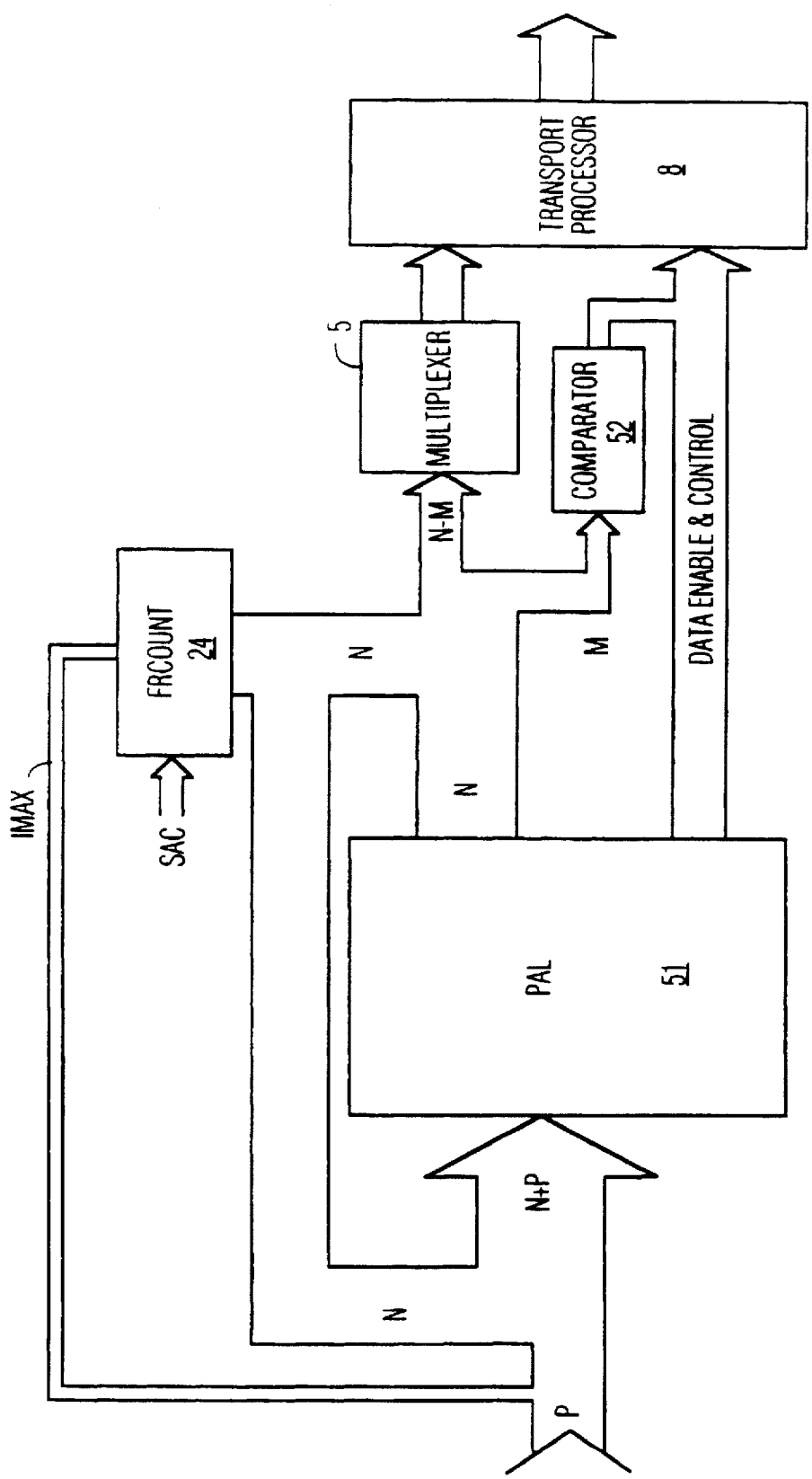
FIG. 3 is an exemplary state machine.

The state machine 22 conditions the multiplexer 5 to pass the appropriate input signal at any given time during packet construction. An exemplary state machine is illustrated in FIG. 3. In this state machine a unit 51, (e.g. a Programmable Array Logic Unit) is addressed with control signal P bits wide from the frame synchronizer and with its own output signal N bits wide The state machine then generates an output signal N bits wide. This signal is fed back as a partial address to the unit 51. N-M of the output bits provided by the unit 51 are coupled to the control input port of the multiplexer 5. The remaining M bits are analyzed through comparator 52 which exhibits a first output state for valid data being currently passed by the multiplexer and a second state otherwise.

The output of the comparator 52 is supplied, along with other DATA ENABLE & CONTROL signals, to the transport processor 8. These signals indicate whether the output from the multiplexer 5 is part of the packet or ignored, where a packet starts, and where the packet ends.

The N bit wide signal from the Programmable Array Logic Unit is supplied to the FRCOUNT circuitry 24. As explained earlier, this circuitry counts the number of frames included in each packet. When the number of frames counted equals a predetermined fixed number, FRCOUNT 24 sends a singnal IMAX to the state machine to indicate that the packet is full and a new packet should began.

Figure 4:
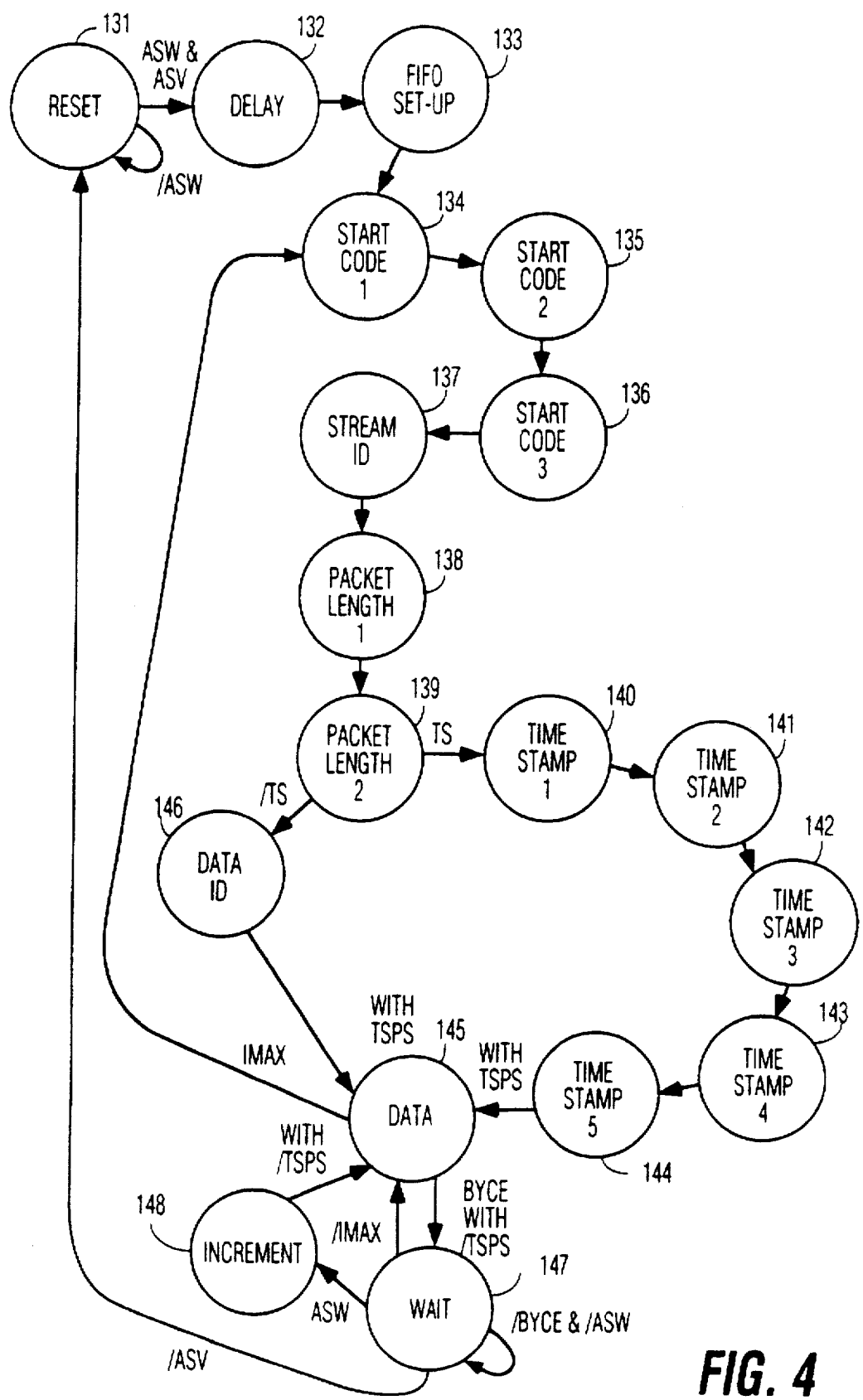
FIGS. 4 and 5 are state "bubble" diagrams for a state machine in the packet sequence controller.

FIG. 4 shows a state "bubble" diagram for the controller. Each "bubble" represents a respective state of the state machine.

Figure 5:
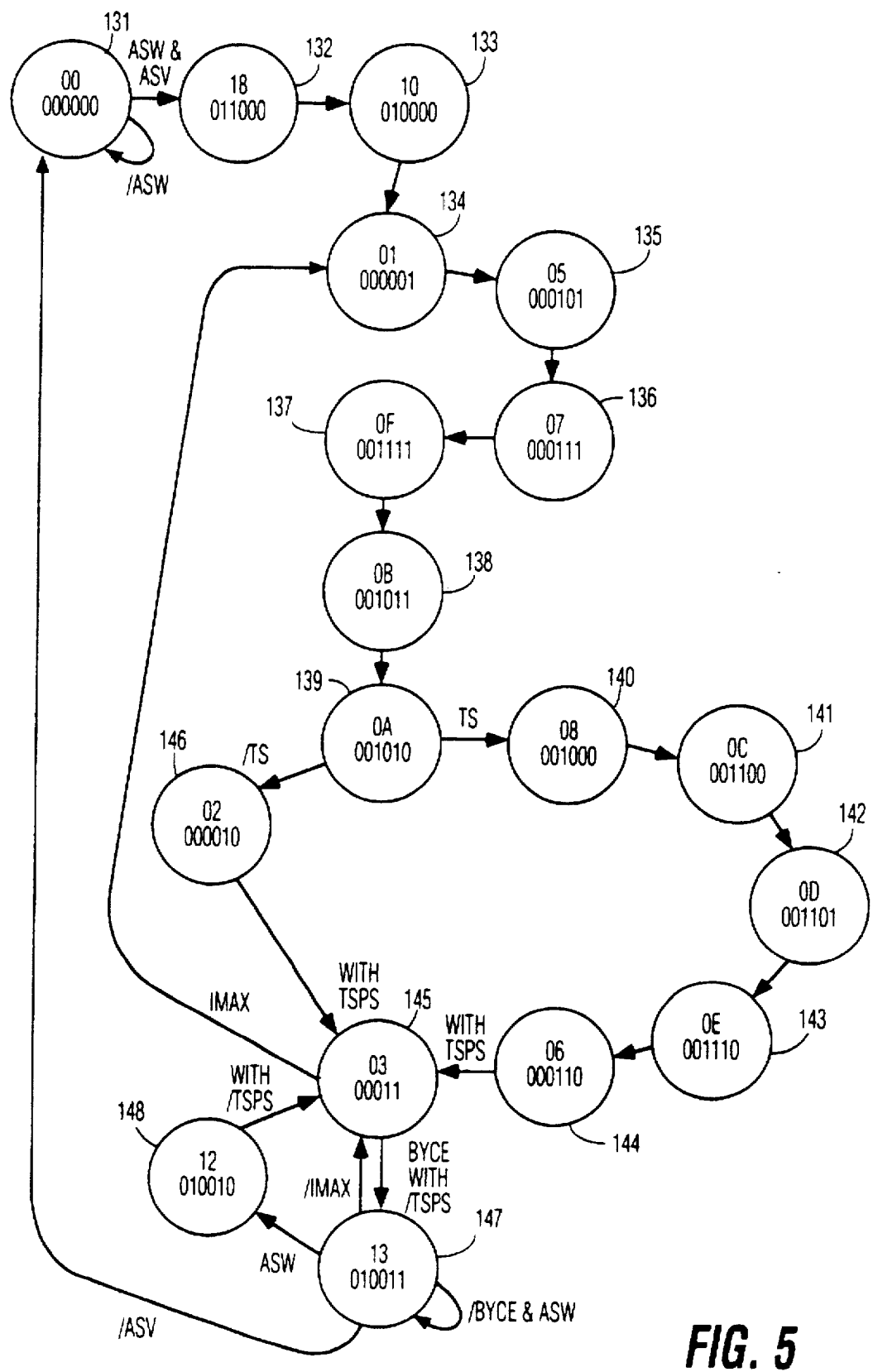

To avoid the necessity of decoding each output from the state machine, the low-order state bits of the machine have been selected so that they may be used to directly control the multiplexer. FIG. 5 shows the "bubble" diagram in FIG. 4 with the state names replaced with their representative binary equivalents. The state machine defines a state represented by a binary number for each input signal to the multiplexer as well as additional control states which are irrelevant to the multiplexer but may control other circuitry. States are selected according to desired multiplexer operation. In the present embodiment, the four least significant bits, LSB, are used to directly control the multiplexer. The additional bits which define further states are, in effect, included to perform ancillary system functions such as instituting "WAIT" intervals, initializing a FIFO, incrementing counter 26, etc. However, it will be recognized that the states relevant to multiplexer control are not unique. The four LSBs only apply to multiplexer control when the remaining more significant bits, MSBs, are all zeros. Thus, for example, in state 132, the multiplexer will pass data as determined by the combination 1000 of LSBs, but this data is not relevant to packet formation.

In order to accommodate the extra states as regards operation of the multiplexer, the MSBs are ORed together to generate an enable/disable signal which exhibits a "0" and "1" states for data passed by the multiplexer being valid and invalid respectively. This enable/disable signal is passed with the data from the multiplexer to the transport processor. A person of ordinary skill in the art could readily alter the number and location of bits to control circuitry and to define states.

At system start-up, the state machine is initially RESET [131] and retains this state until a valid Frame Sync signal (/ASW) from the frame synchronizer 2 is received. Once /ASW is detected, the system passes through the DELAY [132] and FIFO [133] setup states, during which time appropriate DATA ENABLE and CONTROL signals are coupled to the transport processor and appropriate input data are set-up for the multiplexer.

After initialization, the state machine begins packet construction by passing through the START CODE 1 [134], START CODE 2 [135], and START CODE 3 [136] states which condition the multiplexer to sequentially select the three bytes of the packet start code from the header information source circuitry 4. The next state, designated STREAM ID [137], conditions the multiplexer to pass a Service Identifier (SID) from the header information sources circuitry 4 to indicate whether the packet contains audio, video, or digital signals. PACKET LENGTH 1 [138] and PACKET LENGTH 2 [139] are states which contain two bytes indicating the length of the packet in bytes based on frames per packet and frame-size. This data is provided by the Header lookup table 6 and passed by the multiplexer 5 during the states 138 and 139. Depending upon the state of the signal TS from the multiplexer 25, the state machine then conditions the multiplexer 5 to either insert one additional header byte in the DATA ID state [146] or 5 additional bytes while passing through the TIMESTAMP states, TIME STAMP 1 [140], TIME STAMP 2 [141], TIME STAMP 3 [142], TIME STAMP 4 [143], and TIME STAMP 5 [144]. Finally, the system moves to the DATA state [145] conditioning the multiplexer 5 to pass data from the audio digital data signal. After a data byte is inserted, the system enters the WAIT state until another data byte is ready at the latch. If a new frame starts, the system enters the START CODE 1 state. Otherwise, the system alternates between the WAIT and DATA states, spending most of its time in the WAIT state. Recall that the data is arriving at ⅛ the bit rate clock.

Figure 6:
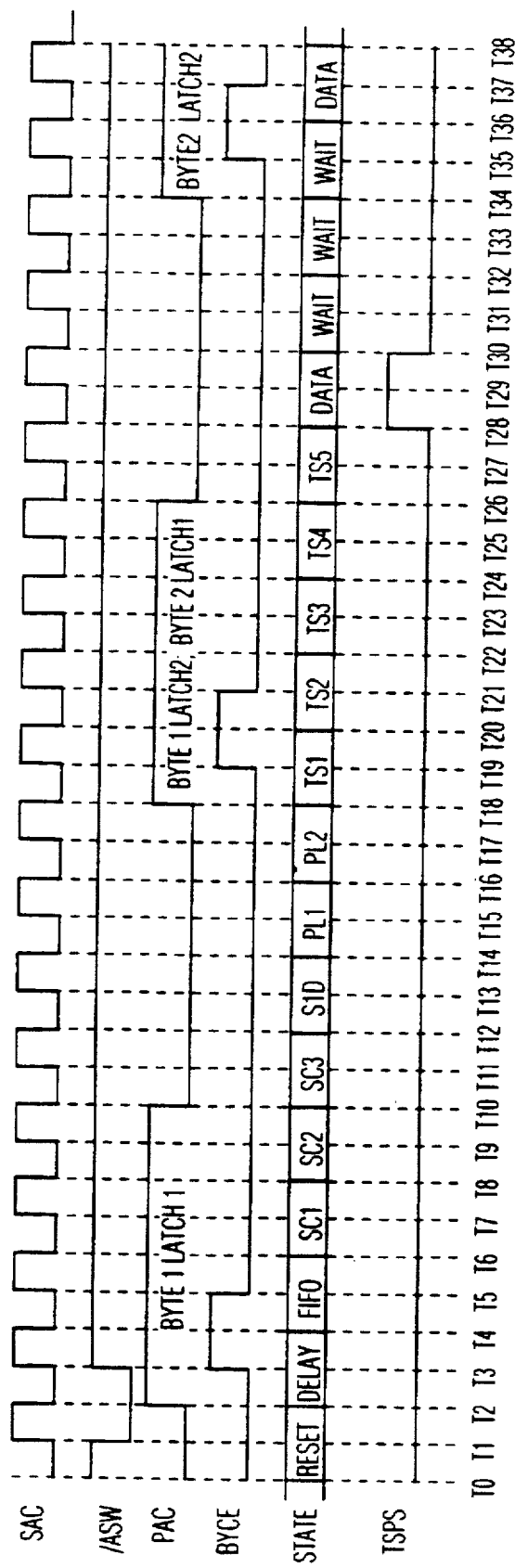
FIG. 6 is a timing diagram for the MPEG packet layer encoder for an initial packet which is time-stamped.
Figure 7:
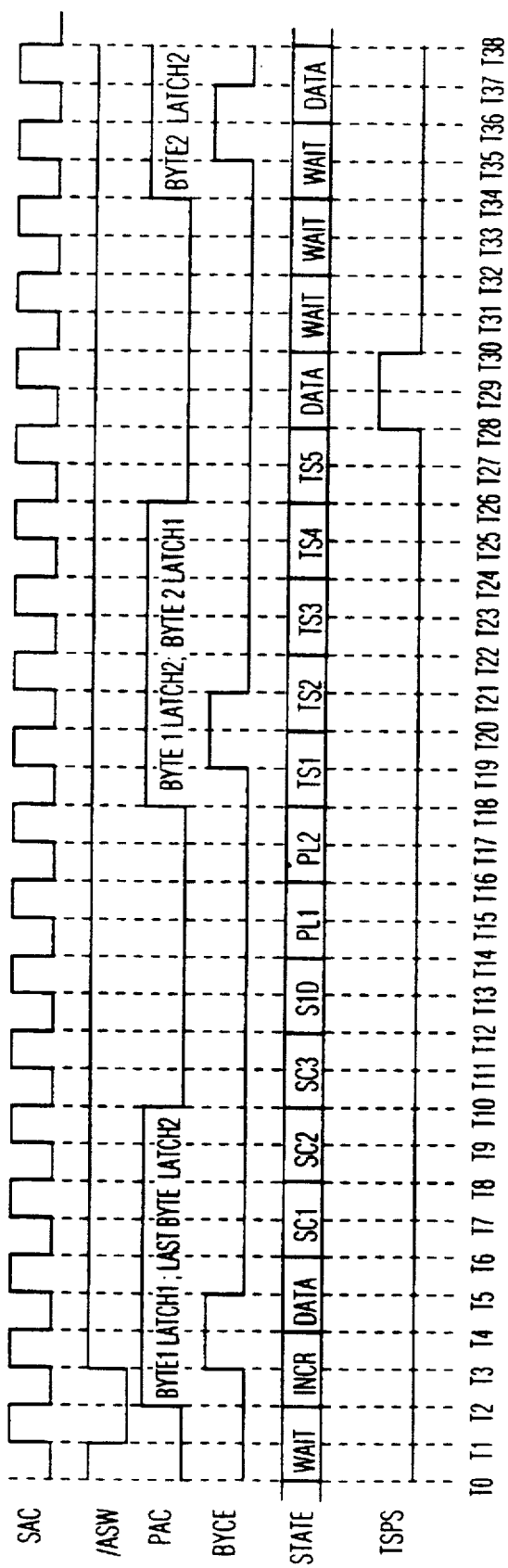
FIG. 7 is a timing diagram for the MPEG packet layer encoder for a follow-on packet which is time-stamped.

FIGS. 6 and 7 illustrate the relative relationships of control signals used in the construction of packets. More specifically, in both FIGS. 6 and 7, SAC represents the bit-rate clock of the serial input data, BYCE represents the byte-rate clock, PAC represents a byte clock, and /ASW represents a start-of-frame signal. STATE represents the current state of the sequence controller. TSPS is representative of the signal provided by the state machine to circuitry TSHIFT to indicate the end of respective audio packets.

In FIG. 6, at time T0 the state machine is assumed to be initially in the RESET state. Upon detection of the first valid start-of-frame signal, the frame synchronizer generates signal /ASW at time T1, triggering the sequence controller to perform initialization, indicated by the DELAY at time T2 and FIFO states at time T4, which sends control information to the transport processor. As was shown in FIG. 5, the output of the state machine for both the DELAY and FIFO states has a "1" in the 5th bit. Therefore, the enable/disable signal is a "1" and the circuitry coupled to the multiplexer 5 is conditioned to ignore data concurrently passed by the multiplexer 5. At this point the DATA byte has been clocked into the first latch of the delay during the intervals T2 to T10. At time T6 the enable/disable signal goes low, enabling the circuitry coupled to the multiplexer 5 to utilize data passed by the multiplexer 5.

The system begins inserting header information as represented by the SC1 (START CODE 1) state at time T6. The sequence controller continues to insert the remainder of the header bytes (at the bit-clock rate) into the data stream. At time T8 the SC2 state is entered and START CODE 2 data is concatenated, at time T10, the SC3 state is entered and START CODE 3 data is concatenated; at time T12, the SID state is entered and STREAM ID data is concatenated; at time T14, the PL1 state is entered and PACKET LENGTH 1 data is concatenated; and at time T16, the PL2 state is entered and PACKET LENGTH 2 data is concatenated.

In this example, time-stamping was chosen. Therefore, at times T18, T20, T22, T24 and T26, the TS1, TS2, TS3, TS4 and TS5 states are entered respectively. During these five states, a 33 bit time code sampled from a modulo R counter, counting a video system clock, and seven fixed marker bits (as specified in the MPEG Standard), parsed into 5 bytes of 8 bits each, are concatenated to the audio packet. During this insertion, the data byte moves to the second latch of the delay, times T17 to T26. Once the header bytes have been inserted, the data byte is read from the second delay latch and inserted into the packet, DATA at time T28. Since byte-wide data is coming into the system at a rate ⅛ the SAC clock rate, no additional data will be available for several clock cycles. The state machine enters the WAIT state at time T30 and extracts one byte of data from the delay latch every eight bit-rate clock cycles until a new byte is indicated by the BYCE signal, at time T35. In the WAIT state, the multiplexer receives no relevant signals from the state machine.

If a new frame is detected as indicated by the /ASW signal, the state machine passes through an INC (INCREMENT) state, as shown in FIG. 7 at time T2. During the INC state, the Frame Counter in FRCOUNT (shown in FIG. 2) is incremented, before the Data Byte in the second latch of the delay is transferred, DATA state at time T4. Due to the delay latches, the system must transfer the final byte of the previous frame before starting a new packet. If the Frame Counter indicates that the desired number of frames has been included in the packet, the machine will move to the SC1 (START CODE 1) state to begin a new MPEG packet. If not, the machine will simply return to the WAIT state, and include the next frame in the current packet.

FIG. 7 shows the operation of the Encoder when a follow-on packet must be constructed. Since Audio MPEG Layer packets consist of an integral number of audio frames, the controller must continue to monitor the incoming data to know when to begin a new packet. Once the required number of frames has been inserted into the packet, the controller monitors the start-of-frame signal /ASW. Due to the delay, the last byte of the current packet must be read out of the second pipeline latch before the header may be inserted as shown by the first DATA state at time T4. The sequence controller then immediately begins creating the header as was done in FIG. 6 (Beginning at time T6, the system passes through the states SC1, SC2, SC3, SID, PL1, PL2, TS1, TS2, TS3, TS4, and TS5). By the time the header has been completed at time T28, the first data byte is available at the second latch. Similar to FIG. 6, the DATA state is entered (at time T28) and a first data byte is concatenated. The WAIT state is entered at time T30 until the second data byte is available at latch 2 to be transferred, at time T36.

The state machine in the present invention allows for 16 header bytes to be inserted into the data stream where a maximum of eight could be accommodated without the delay. The delay does not, however, require more than eight header bytes. If fewer than eight header bytes are required, the controller can introduce WAIT states after the header has been constructed. The controller can thereby "wait" for the data to be transferred through the two latches present in the delay circuitry.

One of the components of the header bytes is a two-byte sequence identifying the length of the entire packet (PACKET LENGTH 1 and PACKET LENGTH 2). The quantity is not fixed and may vary from packet to packet. Several items determine the packet length including whether the packet contains time-stamp information, the number of frames per packet and the number of bytes per frame. These values may vary although generally they are fixed for any given encoding session.

In the present embodiment, the CCS-CDQ-2000 has eight possible frame lengths. These may be represented by three bits. The present embodiment allows for up to 28 frames per packet which may be represented by five bits. Two possible time-stamp options (time-stamping or not) may be represented by one bit. Hence 2(3+5+1)=512 valid combinations exist. Calculation of these values in real time would require large amounts of circuitry. Instead, the computation of the possible packet-size combinations may be performed once and stored before encoding begins. In the present embodiment, shown in FIG. 1, two 512 byte ROMs store the high-order and low-order packet size bytes, shown as Header Look-up Table 6. All the variables determining packet size are decoded in the Header Look-up Table 6 and the result is made directly available to the multiplexer 5 for incorporation into the packet header.

I claim:

1. Apparatus for formatting compressed audio data into packets of data according to a predetermined protocol, said audio data occurring in audio frames each with a frame start code, said apparatus comprising:

a source of said compressed audio data (2) and associated timing signals:

sources of respective packet header data including service type data and timing data (4 and 6);

a multiplexer (5) having respective signal input ports coupled to respective said sources of header data (4 and 6) and said source of compressed audio data (2), an N-bit control input port for applying multiplexer control signals, and an output port;

a state machine (22) having an input port, and having an output port providing an S-bit output signal defining possible system output states where S is greater than N and S and N are positive integers, and wherein said S-bits from said state machine output port are combined with said associated timing signals and coupled to said state machine input port, and N bits of said S-bit output signal are coupled to said control signal input port of said multiplexer for controlling said multiplexer (5) to pass header data and audio data according to said protocol;

means (52) responsive to ones of S-N remaining bits of said S-bit output signal for producing an enable/disable signal; and utilization means (8) coupled to said output port of said multiplexer (5), and controlled by said enable/disable signal.

2. The apparatus set forth in claim 1 wherein the means for producing an enable/disable signal includes a comparator (52).

3. Apparatus for formatting compressed audio data into packets of data according to a predetermined protocol, said audio data occurring in audio frames each with a frame start code, said apparatus comprising:

a source of said compressed audio data (2);

sources of respective packet header data including service type data and timing data (4 and 6);

a multiplexer (5) having respective signal input ports coupled to respective said sources of header data (4 and 6) and said source of compressed audio data (2), an N-bit control input port for applying multiplexer control signals, and an output port;

utilization means (8) coupled to said output port of said multiplexer (5)

a state machine (22) providing an S-bit output signal defining possible system states where S is greater than N and S and N are positive integers, and N bits of said S-bit output signal are coupled to said control signal input port for controlling said multiplexer (5) to pass header data and audio data according to said protocol; and means responsive to a predetermined state of said state machine for providing a count of the number of frames which have been received by said apparatus (28 and 29); and means including means for comparing (27), for setting the state machine (22) to a predetermined state when said count equals a preset value.

4. Apparatus set forth in claim 3 wherein the source of compressed audio data comprises:

an audio coder and compressor (1) for converting analog audio signals into their digital equivalent and compressing said signal; and a parallel to serial converter (2) coupled between said audio coder and compressor (1) and said multiplexer (5) for rendering serial data into eight bit bytes of data.

5. Apparatus as recited in claim 3 wherein said source of packet header data (6) comprises memory means for storing previously calculated possible sizes of said packets of data wherein said possible packet sizes-may vary frame size, number of frames per packet, and inclusion of time-stamping.

6. Apparatus as recited in claim 3 wherein the means responsive to a predetermined state of said state machine comprises:

a state decoder (29) coupled to said S-bit output signal from the state machine (22) to decode said system state and generate a control signal based on the system state; and a counter (28) responsive to said control signal for providing a count of the number of frames received by the multiplexer (5) and generating a count signal for comparison to a preset value.

7. Apparatus as recited in claim 3 further comprising delay means (3) coupled between said source of compressed audio data (2) and said respective input port of said multiplexer (5) for permitting inclusion of predetermined header data at predetermined locations of said compressed audio data.

8. Apparatus for formatting compressed audio data into packets of data according to a predetermined protocol, said audio data occurring in audio frames each with a frame start code, said apparatus comprising:

a source of said compressed audio data (2);

sources of respective packet header data including service type data and timing data (4 and 6);

a multiplexer (5) having respective signal input ports coupled to respective said sources of header data (4 and 6) and said source of compressed audio data (2), an N-bit control input port for applying multiplexer control signals, and an output port, wherein predetermined intervals of data, including compressed audio data and header data, provided at said output port of said multiplexer are designated packets, and respective packets include timing data in said header data according to a pattern;

utilization means (8) coupled to said output port of said multiplexer (5);

a state machine (22) providing an S-bit output signal defining possible system states where S is greater than N and S and N are positive integers, and N bits of said S-bit output signal are coupled to said control signal input port for controlling said multiplexer (5) to pass header data and audio data according to said protocol;

a counter (26) responsive to a particular state of said state machine (22) for generating a count value which is incremented on each occurrence of said particular state; and means responsive to said count value (25) for conditioning said state machine (22) to exhibit predetermined alternate states according to said pattern, which alternate states are determinative of header data being included in a respective packet containing timing data or not containing timing data.

9. Apparatus as recited in claim 8 wherein said means responsive to said count value comprises:

a plurality of 1 and 0 values (30) arranged into said pattern to indicate which packets are to exhibit predetermined alternate states; and a multiplexer (25) having respective input terminals, coupled to said plurality of values and controlled by said counter (26), to produce a 1 or 0 value in response to said plurality of 1 and 0 values and said count value, said 1 or 0 produced by said multiplexer (25) indicating which predetermined alternate state should be exhibited.

* * * * *